Nov. 10, 1964 S. H. KOZA 3,156,885
ELECTRICAL APPARATUS AND METHOD OF MAKING SAME
Filed Nov. 18, 1959 2 Sheets-Sheet 1

Inventor,
Stanley H. Koza,
by Gilbert P. Tarleton
His Attorney.

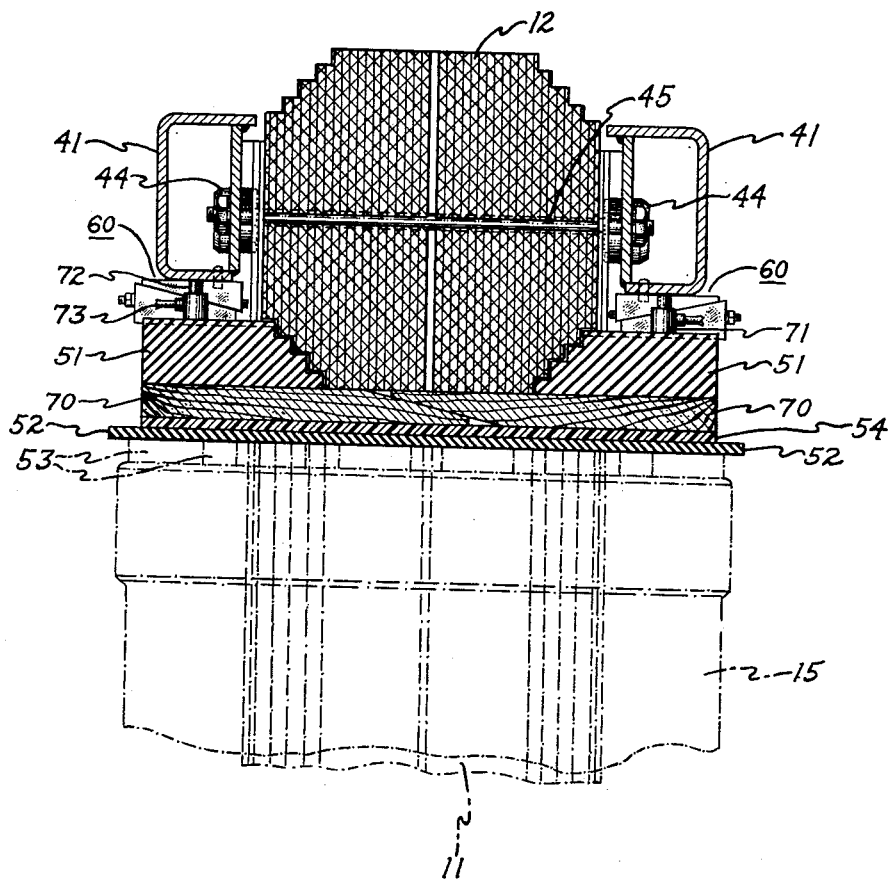

United States Patent Office 3,156,885
Patented Nov. 10, 1964

3,156,885
ELECTRICAL APPARATUS AND METHOD OF MAKING SAME
Stanley H. Koza, Pittsfield, Mass., assignor to General Electric Company, a corporation of New York
Filed Nov. 18, 1959, Ser. No. 853,853
2 Claims. (Cl. 336—197)

This invention relates to electrical apparatus, and more particularly to an improved clamping arrangement for coils and cores in electric induction apparatus such as transformers and the like.

A problem frequently encountered in the construction of electrical apparatus is the provision of means for restraining the movement of current carrying elements in the apparatus. These current carrying elements must often be restrained from movement because of the well-known electrical phenomena that whenever an electrical conductor, constituting part of a closed electric circuit, is situated in a magnetic field and is not parallel to the flux of the field and there is a current passing through the conductor, a force acts upon the conductor that tends to move it sideways through the field. The amount of force acting on the conductor has been found to be proportional to the flux density, the amount of current flowing through the conductor, and the length of the conductor that extends through the field. Consequently, an increase in any one of these quantities will cause a greater force to act on the conductor and tend to move it through the field.

In many types of electrical apparatus, the force acting upon the current carying members that lie in a magnetic field is so slight that the weight of the members or the weight of elements that contact the member is such that these forces are overcome, and the members do not move. However, in many types of electrical induction apparatus the forces acting on the current carrying members become appreciable. Transformers ordinarily have very long windings with large amounts of electrical current flowing through them situated in strong magnetic fields, and I therefore have chosen them as a typical example of electrical apparatus to which my invention can be applied.

A transformer conventionally comprises a closed loop of magnetic material, such as iron or steel, around which a plurality of turns of an electrical conductor are wound. As alternating current is passed through the conductor, magnetic flux is set up in the magnetic material of the core. Consequently, it will be apparent that the conductor windings on the core are under the influence of a force that tends to move them along the core. Under most conditions the weight of the windings will be sufficient to hold them in place. However, when the transformer is subjected to exceptionally heavy surges of current, such as under short circuit conditions, the amount of force exerted on the current carrying conductor windings is greatly increased because both the current flowing through them and the magnetic flux are greatly increased. Under such conditions the windings tend to move along the core of the transformer, and if not rigidly restrained, cause damage to themselves, the insulation around them, or other elements that are in their path of movement. As a result of the possibility of this occurrence, transformers are conventionally made with the windings clamped tightly together so as to reduce the space between them to a minimum.

Previously used methods of clamping transformer windings relied upon inserts or shims that were placed between the windings and core or frame of the transformer. In the past, after the windings were placed over the transformer core, they were pressed together from above by some means, such as screw-actuated pressure elements, that forced them downwardly in small increments. As the transformer windings were being forced downwardly, small shims or inserts were placed one at a time between the windings and the core. When the windings were compressed as far as was possible with the equipment used, the transformer was heat treated to remove moisture and then prepared for shipment, and eventually sent to its user. During the heat treatment, shipment, or under the actual operating conditions, which were often at different temperature or humidity conditions than when the transformer was manufactured, the spacing between the windings often contracted; in this case the shims or inserts would be shaken loose or others needed to be added. This was an extremely cumbersome, tedious, and expensive way of holding the windings in place, since each shim had to be added individually and correctly positioned in place on the other shims.

My invention provides an improved apparatus for clamping the windings of a transformer or the like. Instead of using a plurality of shims, which are placed one on top of the other between the windings and core, I first provide separate box clamps for the core elements and their connecting yoke members. These box clamps are structurally connected together in fixedly spaced apart relation, i.e., interlocked, by members that extend along the core. Insulating means are provided adjacent opposite facing surfaces of each box clamp, and the windings are disposed on the core between the insulating means. A plurality of jacks are then placed at spaced points between the upper clamp and insulating means. The jacks are expanded to force the insulating means which bears upon the core winding away from the upper box clamp. The jacks are then removed one at a time, and in place of each jack is inserted an expandable spacer comprising a pair of movable wedges with slanting faces. The wedges may be moved relative to each other by suitable means such as a nut and bolt; their opposite ends are thus forced apart so as to bear against the insulating means and the box clamp and occupy the space that was previously occupied by the jack. When all of the jacks have been replaced by the pairs of wedges and the wedges are tightened as much as possible, the transformer winding will be securely clamped in place. If changes in the spacing between the winding elements occur, as for example because of shrinkage of the winding during heat treatment or because of changes in temperature and humidity conditions, the wedges can be forced farther apart merely by tightening the nut on the bolt that extends through them. Thus a simple and convenient arrangement is provided for maintaining the clamping pressure on the core winding.

In accordance with one aspect of my invention, I provide an apparatus for clampingly holding the current carrying elements of an electrical apparatus in place. An element in the electrical apparatus that is subject to movement because of changes in the current that flows through it is insulated from clamping means on either end thereof, and a jack is inserted between a clamping element and an insulating element to move them apart. The jack is then removed and replaced by a pair of sliding wedges that occupy the space it once occupied. The wedges are adjustable so that if changes in the spacing between the core elements occur at a later time, the wedges may be moved relative to each other and their opposite surfaces forced apart so as to occupy the space between the clamping means and the insulating means.

Accordingly it is an object of my invention to provide a new and improved clamping arrangement for the elements of an electric induction apparatus.

It is a further object of my invention to provide an improved clamping means for the electrical and magnetic elements of an electric induction apparatus which permit expansion of the clamping means if a portion of the apparatus shrinks in size.

My invention will be better understood from the following description taken in connection with the accompanying drawings and its scope will be pointed out in the appended claims.

FIGURE 3 is a cross-sectional view taken along the lines 3—3 in FIGURE 1.

Figure 1:
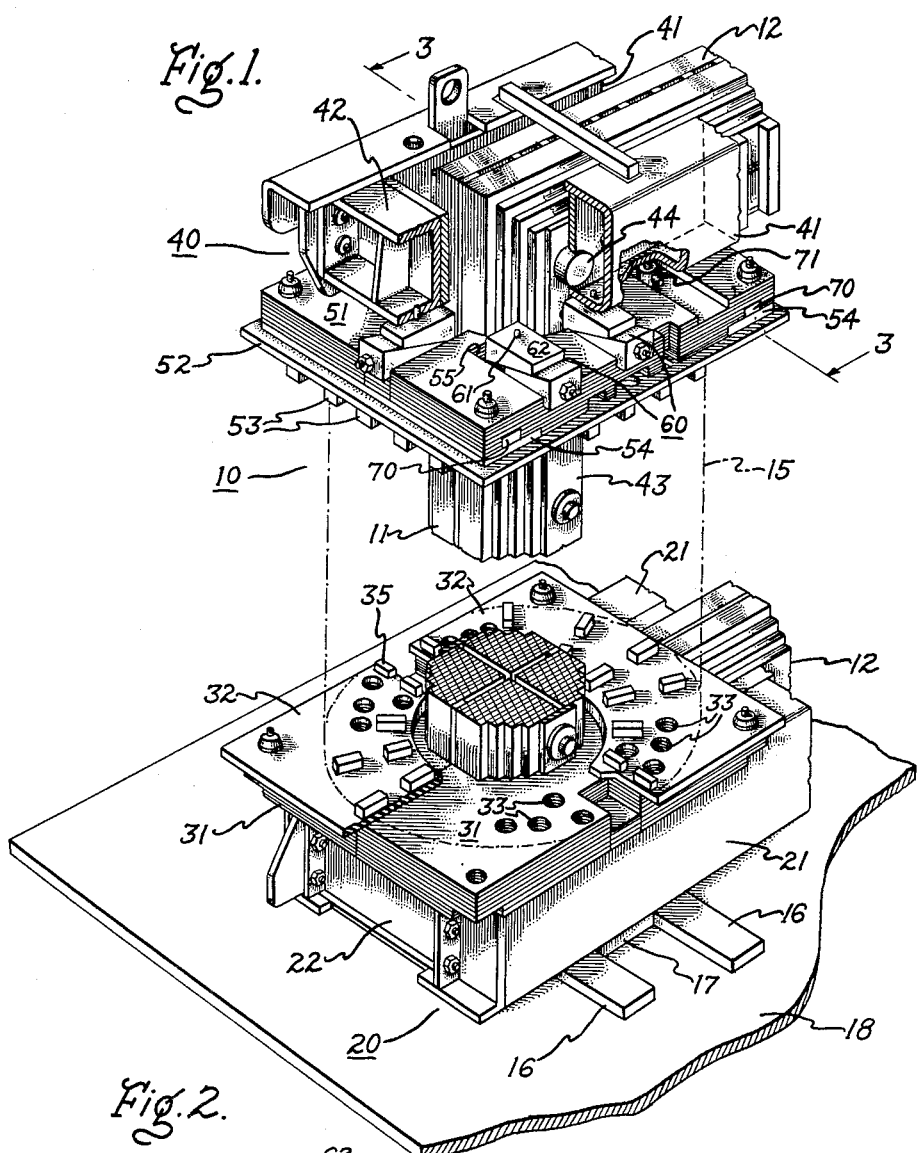
FIGURE 1 is a perspective, partially cross-sectional view of a transformer employing the clamp of my invention.

Referring now to the drawings, and in particular FIGURE 1, therein is illustrated a portion of a transformer 10 of the type disclosed in application Serial No. 852,301, now Patent No. 3,137,829 of N. E. Dillow et al., filed November 12, 1959, and assigned to the assignee of the present invention. The transformer 10 comprises one or more upstanding core elements 11 which are connected by upper and lower yoke elements 12. A winding 15 surrounds each core element, said winding being indicated in phantom for the purposes of clarity of the drawing. The transformer 10 may be placed in a tank of cooling fluid, the bottom of such a tank being indicated at 18. The transformer may rest upon spaced bars 16 and blocks 17, which define chambers below each core element for receiving the cooling fluid.

The core and yoke elements are clamped together by first clamp means 20 having elongated members 21 which are joined together by end members 22, only one end member being shown, so as to form a box clamp disposed on all sides of the lower yoke element 12. Insulation means, such as the blocks 31 and plates 32, are placed on the first clamp means below the winding 15. The insulation means may be provided with apertures 33 that are aligned with apertures in the elongated members 21 so that cooling fluid may be passed from inside the members 21 through the insulating means and up through channels that are provided in the winding 15, as disclosed in the above mentioned application of N. E. Dillow et al. Spacer elements 35 are provided between the insulating plates 32 and winding 15 according to conventional practice. Second clamp means 40 substantially identical to the first clamp means 20 may be provided on all sides of the upper yoke 12. The second clamp means 40 comprises elongated members 41 joined by end members 42. The first and second clamp means are interlocked in fixedly spaced apart relation by means of a connecting or interlocking member 43 that has a button 44 on each end thereof, the buttons 44 registering in apertures in the elongated members 21 and 41. The clamp means may also be connected to the core and yoke elements by means of bolts 45 extending therethrough, as indicated in FIGURE 3.

The second clamping means 40 is separated from the winding 15 by insulating means comprising blocks of insulation 51 which rest on a plate 52 of insulating material. The plate 52 essentially serves only as a support to which the spacers 53 are attached and is hence relatively thin and structurally weak. A strip 54 of denser, structurally stronger material may be placed between the plate 52 and blocks 51 to reinforce the plate 52. Pairs of elongated wedges 70, which are described in detail in the following paragraphs, may be disposed in slots extending through the blocks 51. All elements of the transformer located between the windings 15 and the first and second clamp means should be made of non-metallic insulating material in order to minimize induced currents and breakdown of insulation.

The upper surface of the blocks 51 may be provided with a plurality of spaced grooves 55 in which expandable spacers 60 are disposed. Each expandable spacer 60 is formed of a pair of similar wedges 62, 63 disposed in face to face relation. In order to hold the wedges in place, the upper wedges 62 may have a pin 61 on the upper surface thereof for registering with a corresponding aperture in the elongated members 41. Of course, it will be understood that in place of a single pin 61 and cooperating groove 55 for holding the pairs of wedges 62, 63 in place, the blocks 51 need not be grooved, but instead, a pair of pins 61 and corresponding mating apertures in the elements 41 may be provided.

Figure 2:
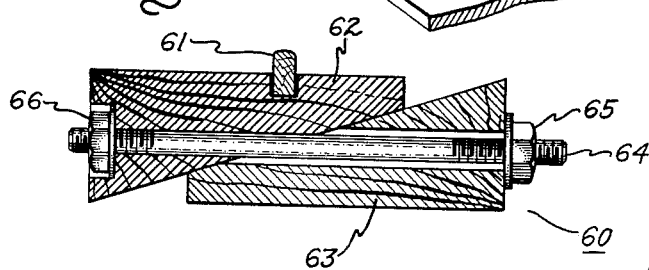
FIGURE 2 is a cross-sectional view of a pair of sliding wedges that may be employed with the invention illustrated in FIGURE 1.

Referring now to FIGURE 2, the expandable spacer 60 is seen to comprise an upper wedge 62 and a lower wedge 63. The wedges 62 and 63 have opposed slanting faces that contact each other. The top and bottom surfaces of the spacer 60 are substantially parallel, so as to provide bearing surfaces for forcing parts of the transformer 10 apart. A bolt 64 extends through an aperture in each wedge; the aperture in the upper wedge 62 may have a diameter so dimensioned that the wedge frictionally engages the bolt 64 and thus renders the bolt substantially immovable with respect to the wedge. The aperture in the lower wedge 63 is significantly larger in diameter than the bolt 64. Nuts 65 and 66 are threaded on opposite ends of the bolt 64, and may be separated therefrom by suitable means, such as washers, to provide increased bearing surfaces. When the nut 65 is tightened, the wedges 62 and 63 slide relative to each other along their contacting surfaces, and their upper and lower parallel surfaces are thus forced apart. Although the wedges 62 and 63 may be made of any insulating material, it has been found that wood possesses sufficient mechanical strength to bear the forces the wedges must withstand. The pin 61 may be made from a wooden dowel that is glued or otherwise secured in an aperture in the upper wedge 62.

A plurality of adjustable means capable of applying great pressure to the windings, such as hydraulic jacks 71, are placed in the grooves 55 before the expandable spacers 60 are placed in the grooves. The hydraulic jacks 71 each comprise a hollow cylinder in which a piston 72 is movable under hydraulic pressure, and a fluid inlet connection 73, which may be connected to a suitable source of fluid pressure (not illustrated).

By using the parts described in the preceding paragraphs, a uniquely simple method and means for clamping the windings of a transformer is provided. The first clamp means 20 at the lower end of the transformer is seen to clamp the yoke to the core in a first plane by means of members 21 and 22 that surround the yoke 12 on all sides thereof adjacent the lower end of the winding 15. Similarly, the second clamp means 40 at the upper end of the transformer is seen to comprise members 41 and 42 that surround the yoke on all sides thereof and clamp the yoke to the core in a second plane parallel to the first plane. When these two clamping means are structurally connected by the member 43 it will be seen that movement of the winding axially along the core 11 will be prevented because the first and second clamp means then provide a clamp that engages the winding in a plane substantially perpendicular to the first and second planes.

However, because of contraction and expansion of the windings caused by changes in humidity, temperature conditions, and electrical phenomena that occur in the transformer, it is necessary to additionally provide adjustable means for restraining movement of the windings along the core. The windings are insulated from the core both above and below by insulating blocks and plates as previously described. After the winding 15 has been placed around the core 11 so that it rests on the lower insulating means (31, 32, 35, etc.), the upper insulating means (51–54, etc.) is placed on the winding. Then, the upper yoke and second clamp means 40 are positioned and secured, and a plurality of hydraulic jacks 71 are placed in the slots 55 between the members 41 and the insulating blocks 51. Hydraulic pressure is simultaneously applied to each of the hydraulic jacks, thus forcing the insulating means downwardly against the winding 15 so as to compress the winding. After the winding has been compressed, the hydraulic pressure on one of the jacks 71 is released and that jack is removed. A spacer 60 is immediately placed in the space once occupied by the removed jack. The pin 61 on the upper wedge 62 is registered in the proper opening in the members 41, and the nut 65 is then tightened until the upper wedge 62 is forced as far upwardly as it will go so that the wedges occupy the space separating the member 41 and the insulating means. At this point the above described elements provide an intermediate product in the manufacture of a transformer in which the winding 15 and upper clamp means 40 are forced apart by both the hydraulic jacks 71 and the pair 60 of slidable wedges. The above sequence is repeated until all of the hydraulic jacks 71 have been replaced by a pair 60 of slidable wedges. The transformer is then ready for further assembly operations such as heat treating to remove moisture. If the windings contract during the heat treatment, or after the transformer is finally installed in a power distributing system, they may be again rigidly clamped by merely tightening the nuts 65, which forces the wedges 62 and 63 apart.

It has been found that when the windings 15 expand or move upwardly along the core 11, the forces acting upon the plate 52 force the plate 52 against the blocks 51.

Referring now to FIGURE 3, it will be seen that although the plate 52 is prevented from movement at its ends by the blocks 51, upward bowing of the center of plate 52 would not be opposed by the blocks 51. Such deflection would cause damage to the plate 52 and insulation on the winding 15 were it not prevented by the reinforcing strip 54 which has been provided between the plate 52 and blocks 51 to oppose such deflection of the plate. It has been found to be impossible to determine the exact thickness required for the strip 54 because of the wide tolerances used in the manufacture of commercial transformers. Consequently, aligned slots have been provided in the blocks 51, and a pair of elongated slidable wedges 70 disposed in these slots. Thus, after all of the transformer assembly steps outlined in the preceding paragraphs have been performed, the wedges 70 may be forced into the slots in the blocks 51 to force the strip 54 against the plate 52. Also, after the heat treating operation, the wedges 70 may be forced together to remove any slack resulting from shrinking of the winding.

In the apparatus forming my invention, as disclosed in the preceding paragraphs, the advantages inherent in the restraining of the movement of current carrying elements are obtained without resort to the tedious procedures and costly apparatus employed in the past. In the specific embodiment of my invention described above, hydraulic means were first employed to separate a transformer winding from a clamping element; adjustable mechanical means were then used to occupy the space created by removal of the hydraulic means. Additionally, adjustable reinforcing means were provided to prevent deflection and consequent damage to insulating elements on the transformer.

It will be understood, of course, that, while the form of the invention herein shown and described constitutes the preferred embodiment of the invention, it is not intended herein to illustrate all of the equivalent forms or ramifications thereof. It will also be understood that the words used are words of description rather than of limitation, and that various changes may be made without departing from the spirit and scope of the invention herein disclosed, and it is aimed in the appended claims to cover all such changes as fall within the true spirit and scope of the invention.

What I claim as new and desire to secure by Letters Patent of the United States is:

1. A transformer comprising core elements joined by yoke elements extending therebetween, a winding surrounding one of said core elements between said yoke elements, first clamping means engaging a yoke element and said core elements in a first plane adjacent one end of said winding, second clamping means engaging another yoke element and said core elements in a second plane parallel to said first plane and adjacent the other end of said winding, an insulating plate at each end of said winding surrounding said one core element and insulating said winding from said clamping means, the insulating plate adjacent said first clamping means being fixed and the insulating plate adjacent said second clamping means being movable along said one core element away from said second clamping means, and a plurality of expandable spacers formed of electrical insulating material interposed between said second clamping means and the adjacent insulating plate for moving said insulating plate away from said second clamping means and thus exerting clamping pressure on said winding, said spacers each comprising a pair of cooperating wedges having slanting faces, said pairs of wedges being adjustably connected together and oppositely disposed in face-to-face relation with their slanting faces in sliding engagement and their top and bottom surfaces parallel.

2. A transformer comprising core elements joined by parallel spaced apart yoke elements extending therebetween, a winding surrounding one of said core elements between said yoke elements, separate clamping means engaging said yoke elements and core elements adjacent opposite ends of said winding, said clamping means being disposed in predetermined parallel spaced-apart relation, interlocking means structurally connecting said clamping means to maintain said predetermined spaced relation, a rigid plate of insulating material at each end of said winding surrounding said one core element and insulating said winding from said clamping means and said yoke elements, one said insulating plate being fixedly stopped against one said clamping means and the other said plate being movable along said one core element away from the other said clamping means, and a plurality of pairs of expandable spacers formed of electrical insulating material and interposed between said other insulating plate and other clamping means, said spacers each comprising a pair of cooperating wedges having slanting faces, said pairs of wedges being adjustably connected together and disposed in face-to-face relation with their intermediate slanting faces in slidable engagement and their top and bottom surfaces parallel, the adjustable connection between each said pair of wedges comprising a through bolt intermediate and parallel to said top and bottom surfaces.

References Cited by the Examiner

UNITED STATES PATENTS

| | | | |
|---|---|---|---|
| 1,832,616 | 11/31 | Brown | 336—210 X |
| 1,961,761 | 6/34 | Hendricks | 336—210 X |
| 2,700,207 | 1/55 | Zimsky | 29—155.58 |
| 2,762,988 | 9/56 | Romazal et al. | 336—210 |
| 2,780,785 | 2/57 | Ford | 336—210 |
| 2,870,525 | 1/59 | Hansen et al. | 29—155.58 |
| 2,886,791 | 5/59 | Barengoltz | 336—197. |
| 2,910,663 | 10/59 | Wilk et al. | 336—65 X |

JOHN F. BURNS, *Primary Examiner.*

MILTON O. HIRSHFIELD, *Examiner.*